United States Patent
Tai et al.

(10) Patent No.: US 8,283,406 B2
(45) Date of Patent: Oct. 9, 2012

(54) THERMOPLASTIC POLYMER AND NOVOLAC COMPOSITION AND METHOD

(75) Inventors: Xiangyang Tai, Shanghai (CN); Yabin Sun, Shanghai (CN); Xiaorong A. He, Shanghai (CN); Given Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/140,076

(22) PCT Filed: Dec. 31, 2008

(86) PCT No.: PCT/CN2008/073888
§ 371 (c)(1),
(2), (4) Date: Jun. 16, 2011

(87) PCT Pub. No.: WO2010/075649
PCT Pub. Date: Jul. 8, 2010

(65) Prior Publication Data
US 2011/0251336 A1    Oct. 13, 2011

(51) Int. Cl.
*C08L 61/04*    (2006.01)
*C08L 73/00*    (2006.01)

(52) U.S. Cl. .................. 524/509; 524/508
(58) Field of Classification Search .............. 524/509
See application file for complete search history.

(56) References Cited

U.S. PATENT DOCUMENTS

| | | | |
|---|---|---|---|
| 4,962,137 A * | 10/1990 | McKinney et al. | 523/400 |
| 7,501,174 B2 | 3/2009 | Halahmi et al. | |
| 2007/0101679 A1 * | 5/2007 | Harthcock et al. | 52/782.1 |
| 2007/0264888 A1 | 11/2007 | Harada et al. | |
| 2008/0213572 A1 * | 9/2008 | Halahmi et al. | 428/332 |
| 2009/0169803 A1 | 7/2009 | Halahmi et al. | |

FOREIGN PATENT DOCUMENTS

WO    2007079026 A2    7/2007

* cited by examiner

*Primary Examiner* — Hui Chin
(74) *Attorney, Agent, or Firm* — Whyte Hirschboeck Dudek SC

(57) ABSTRACT

Compositions comprising a novolac polymer, an olefin-based polymer with an epoxy group, a filler and optionally a thermoplastic polymer are provided. The compositions may be halogen-free. The present compositions exhibit excellent compatibility between the novolac polymer and the olefin-based polymer with an epoxy group resulting in compositions with superior mechanical properties.

20 Claims, 3 Drawing Sheets

THERMOPLASTIC POLYMER AND NOVOLAC COMPOSITION AND METHOD

BACKGROUND

Polyvinyl chloride (PVC) is a versatile and widely used thermoplastic polymer. One of the myriad uses of PVC is as an insulative material for electronic parts, and wire/cable applications in particular. Ecological and health concerns regarding PVC, however, are driving the art to find PVC substitutes. For insulation applications, halogen-free thermoplastics show promise as PVC substitutes. Known are blends of halogen-free thermoplastics and one or more other polymers to form a polymeric composite. Achieving halogen-free polymeric composites with a balance of favorable PVC-like properties, however, has been problematic. Halogen-free thermoplastics are oftentimes incompatible with many types of other polymers desired for blending. Incompatibility between the thermoplastic component and the other polymeric component(s) yields a composite with poor mechanical properties having little or no usefulness.

Desirable would be a halogen-free thermoplastic composite having insulative and processability properties similar to PVC. Further desired would be a halogen-free thermoplastic composition having the aforementioned properties that is also flame-retardant.

SUMMARY

The present disclosure is directed to compositions composed of an olefin-based polymer with an epoxy group and a novolac polymer. The olefin-based polymer with an epoxy group and the novolac polymer are each halogen-free. The present compositions exhibit excellent compatibility between the epoxy containing olefin-based polymer component and the novolac component yielding compositions with superior mechanical properties.

In an embodiment, a composition is provided. The composition includes an olefin-based polymer with an epoxy group, a novolac polymer, a filler, and optionally a thermoplastic polymer. Provision of the olefin-based polymer with an epoxy group and the filler surprisingly and unexpectedly promote compatibility between the olefin polymer moiety of the olefin-based polymer with an epoxy group and the novolac polymer.

In an embodiment, the composition includes a thermoplastic polymer. The thermoplastic polymer may be an olefin-based polymer. When the composition includes the thermoplastic polymer, the olefin-based polymer with an epoxy group further provides compatibility between the thermoplastic polymer and the novolac polymer.

In an embodiment, the novolac polymer is a phenol novolac polymer.

In an embodiment, the olefin-based polymer with an epoxy group is a copolymer of an olefin and an unsaturated glycidyl ester. In a further embodiment, the olefin-based polymer with an epoxy group is an ethylene/glycidyl methacrylate copolymer.

In an embodiment, the composition may optionally include one or more additional components. The optional additional components are selected from a flame retardant, an anti-drip agent, a functionalized polyolefin, a processing additive, an elastomeric composition, a dispersed polymer, and combinations thereof.

In an embodiment, the composition has a tensile strength at 100% strain greater than about 2.1 Mpa as measured in accordance with ASTM D638. In another embodiment, the composition has a tensile strength at 200% strain greater than about 2.2 Mpa as measured in accordance with ASTM D638.

The present disclosure provides another composition. In an embodiment, a heterophasic composition is provided. The heterophasic composition includes a continuous phase and a discontinuous phase. The continuous phase comprises the olefin-based polymer with an epoxy group and optionally the thermoplastic polymer. The discontinuous phase comprises the novolac polymer. The discontinuous phase is dispersed in the continuous phase. The heterophasic composition also includes a filler.

In an embodiment, the continuous phase includes a thermoplastic polymer that is an olefin-based polymer. The discontinuous phase includes a phenol novolac polymer.

In an embodiment, the discontinuous phase has a domain size less than about 10 μm. The discontinuous phase domain size of less than about 10 μm indicates good compatibility between the continuous phase and the discontinuous phase. In a further embodiment, the discontinuous phase is a phenol novolac polymer.

The heterophasic composition may optionally include one or more additional components. The additional components may be selected from a flame retardant, an anti-drip agent, a functionalized polyolefin, a processing additive, an elastomeric composition, a dispersed polymer, and combinations thereof.

The compatibility between the continuous phase of olefin-based polymer with an epoxy group and the discontinuous phase of novolac polymer yields a heterophasic composition with a tensile strength at 100% strain greater than about 2.1 Mpa as measured in accordance with ASTM D638. In a further embodiment, the heterophasic composition has a tensile strength at 200% strain greater than about 2.2 Mpa as measured in accordance with ASTM D638.

The present disclosure provides a process. In an embodiment, a process for producing a heterophasic composition is provided. The process includes blending a novolac polymer, an olefin-based polymer with an epoxy group, a filler, and optionally a thermoplastic polymer. The process further includes forming a heterophasic composition. In an embodiment, the blending includes melt blending, extrusion blending, extrusion molding, or any combination thereof.

In an embodiment, the process includes dispersing a discontinuous phase comprising the novolac polymer in a continuous phase comprising the olefin-based polymer with an epoxy group and optionally the thermoplastic polymer. In a further embodiment, the process includes forming the discontinuous phase of the novolac polymer into domains of a size less than about 10 μm. Provision of the olefin-based polymer with an epoxy group promotes compatibility between the continuous phase and the discontinuous phase resulting in the novolac polymer domain size of less than about 10 μm. The novolac polymer domains of the discontinuous phase are uniformly dispersed throughout the continuous phase.

An advantage of the present disclosure is the provision of a polymer composite comprising an olefin-based polymer with an epoxy group and a novolac polymer and improved compatibility therebetween.

An advantage of the present disclosure is the provision of a polymer composite comprising an olefin-based polymer with an epoxy group, a thermoplastic polymer, and a novolac polymer, with improved compatibility therebetween.

An advantage of the present disclosure is the provision of an improved insulative thermoplastic polymer composite.

An advantage of the present disclosure is the provision of an insulative thermoplastic polymer composite that is halogen-free.

An advantage of the present disclosure is the provision of a halogen-free, insulative thermoplastic polymer composite that is flame-retardant.

An advantage of the present disclosure is the provision of a halogen-free insulative thermoplastic polymer composite having PVC-like properties and processability.

An advantage of the present disclosure is the provision of a flame-retardant insulative thermoplastic polymer composite that is halogen-free for wire and cable applications.

An advantage of the present disclosure is a halogen-free, flame-retardant insulative thermoplastic polymer composite with excellent tensile strength.

DETAILED DESCRIPTION

Figure 1:
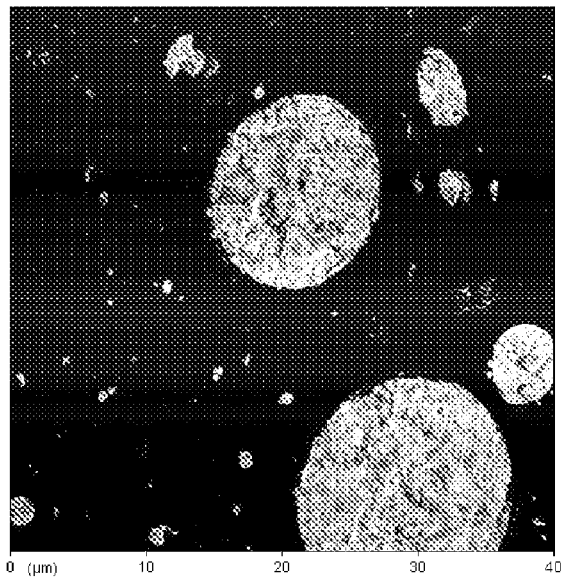
FIG. 1 is an atomic force microscopy (AFM) image of a composition.

The present disclosure is directed to compositions that are thermoplastic, halogen-free and exhibit excellent insulative, mechanical, and processability properties. The present compositions may have mechanical and/or processability properties similar to, or substantially similar to, PVC.

In an embodiment, a composition is provided. The composition includes a novolac polymer, an olefin-based polymer with an epoxy group, and a filler. The composition may optionally include a thermoplastic polymer. The composition may or may not be a blend. The term "blend," "polymer blend," or "composite" as used herein, is a blend of two or more polymers. Such a blend may or may not be miscible (not phase separated at the molecular level). Such a blend may or may not be phase separated. Such a blend may or may not contain one or more domain configurations, as determined from transmission electron spectroscopy, light scattering, x-ray scattering, and other methods known in the art. In an embodiment, the present composition is a blend.

In an embodiment, the present composition includes one or more thermoplastic polymers. Nonlimiting examples of suitable thermoplastic polymers include olefin-based polymers, polyamides, polycarbonates, polyesters, thermoplastic polyurethanes, thermoplastic polyesters, polystyrenes, high impact polystyrenes, polyphenylene oxides, and any combination thereof. In an embodiment, the thermoplastic polymer is a halogen-free polymer. As used herein, "halogen-free" is the absence of a halogen. In other words, a "halogen-free" component is void of halogen atoms.

In an embodiment, the thermoplastic polymer is an olefin-based polymer. As used herein, an "olefin-based polymer" is a polymer containing, in polymerized form, an olefin, for example ethylene or propylene. The olefin-based polymer may contain a majority weight percent of the polymerized form of the olefin based on the total weight of the polymer. Nonlimiting examples of olefin-based polymers include ethylene-based polymers and propylene-based polymers. In a further embodiment, the olefin-based polymer is an ethylene-based polymer. Nonlimiting examples of suitable ethylene-based polymers include ethylene/α-olefin copolymers (ethylene/propylene copolymer, ethylene/butene copolymer, ethylene/octene copolymer), ethylene/(acrylic acid)copolymer, ethylene/methylacrylate copolymer, ethylene/ethylacrylate copolymer, ethylene/vinyl acetate copolymer, ethylene/propylene/diene copolymer, and any combination thereof. The thermoplastic polymer provides flexibility, solvent resistance, thermal stability and/or mechanical strength to the final composition.

In an embodiment, the thermoplastic polymer is an ethylene/α-olefin copolymer, an olefin block ethylene/α-olefin copolymer, or a combination thereof. In one embodiment, the thermoplastic polymer is an ethylene/butene copolymer. In another embodiment, the thermoplastic polymer is an olefin block ethylene/butene copolymer.

The present composition includes a novolac polymer. The novolac polymer provides char-forming performance during combustion. The novolac polymer is a carrier for other additives that may otherwise be incompatible with the thermoplastic polymer. In an embodiment, the novolac polymer is halogen-free.

The novolac polymer may be a phenol novolac polymer, or a combination of a phenol novolac polymer with an epoxy novolac polymer. As used herein, a "phenol novolac polymer" refers to a polymer produced by reaction of (a) one or more phenol compounds and (b) an aldehyde and/or an acetone.

Nonlimiting examples of suitable phenols include phenol, cresol, xylenol, naphthol, alkylphenol, and/or any other hydrocarbyl substituted phenol. Nonlimiting examples of suitable aldehydes include formaldehyde, paraformaldehyde, acetaldehyde, n-butylaldehyde, glutaraldehyde, crotonaldehyde, and/or glyoxal.

In an embodiment, the phenol novolac polymer has the structure (I):

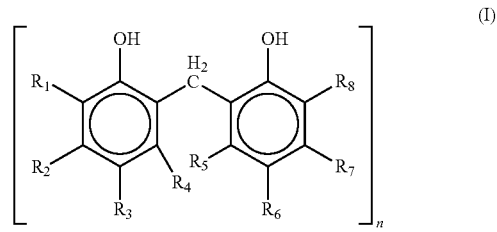

wherein n is an integer from 1 to 1000. $R_1$, $R_2$, $R_3$, $R_4$ $R_5$, $R_6$, $R_7$, and $R_8$, are the same or different. Each of $R_1$-$R_8$ is selected from hydrogen, a hydrocarbyl group having 1 to 20 carbon atoms, and a hydroxyl group. As used herein, the term "hydrocarbyl" and "hydrocarbon" refer to substituents containing only hydrogen and carbon atoms, including branched or unbranched, saturated or unsaturated, cyclic, polycyclic or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

In an embodiment, the reaction is a condensation reaction between a phenol and an aldehyde. The degree of condensation may be in the range of a lower limit such that about less than 10% free monohydric phenol is present and an upper condensation limit such that the phenol novolac polymer is thermoplastic. In a further embodiment, the phenol novolac polymer has a molecular weight from about 100 to about 500,000, or from about 300 to about 300,000, or from about 500 to about 50,000. A nonlimiting example of a suitable novolac polymer is KPH-F2002, a phenol novolac polymer, available from the Kolon Chemical Company, South Korea.

In an embodiment, the novolac polymer is an epoxy novolac polymer with the structure (II) below:

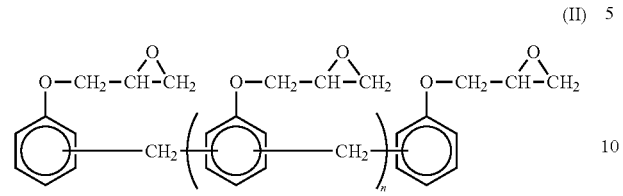
(II)

wherein n is an integer from 1 to about 1000.

In an embodiment, the novolac polymer is a flame retardant.

The present composition includes an olefin-based polymer with an epoxy group. In an embodiment, the olefin-based polymer is an ethylene-based polymer. The ethylene-based polymer may be any ethylene-based polymer as disclosed herein. The epoxy group may be a side functional epoxy group, which is attached during polymerization or by post reactive extrusion. In an embodiment, the epoxy group is an epoxy ester. The epoxy ester has the structure (III):

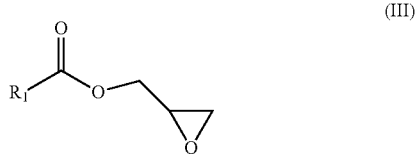
(III)

wherein $R_1$ is selected from a substituted hydrocarbyl group or an unsubstituted hydrocarbyl group. As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI and VII of the Periodic Table. Nonlimiting examples of heteroatoms include: F, N, O, P, B, S, and Si. In an embodiment, the olefin-based polymer with an epoxy ester is halogen-free. Nonlimiting examples of suitable epoxy esters include unsaturated glycidyl esters such as glycidyl acrylate and/or glycidyl methacrylate ("GMA").

The olefin-based polymer and the epoxy ester each may be a comonomer of a polymer. In an embodiment, the olefin-based polymer with an epoxy group is an alkylene/epoxy ester copolymer. It is understood that the alkylene/epoxy ester copolymer contains units derived from the alkylene. The alkylene may be selected from one or more $C_1$-$C_6$ alkylenes including such nonlimiting examples as propylene and/or ethylene. Nonlimiting examples of suitable alkylene/epoxy ester copolymers include ethylene/glycidyl methacrylate copolymer (or ethylene-co-glycidyl methacrylate copolymer) and poly(ethylene-co-methyl acrylate-co-glycidyl methacrylate).

In an embodiment, the olefin-based polymer with an epoxy group is an ethylene/glycidyl methacrylate copolymer with the structure (IV):

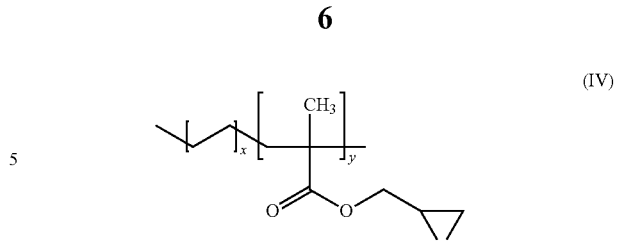
(IV)

wherein x is an integer from 10 to about 30,000. The term y is an integer from 1 to about 1000. A nonlimiting example of a suitable ethylene/glycidyl methacrylate copolymer is Igetabond 2C from Sumitomo Chemical, with 6 wt % GMA, 94 wt % ethylene (based on the total weight of the copolymer). The olefin-based polymer with an epoxy group reacts with the novolac polymer as discussed in detail below.

The present composition includes one or more fillers. The filler is a solid particulate material. Nonlimiting examples of suitable filler include silica, mica, glass fiber, talc, nanoclay, calcium carbonate, a metal hydrate, and any combination thereof. Nonlimiting examples of suitable metal hydrates include aluminum hydroxide, magnesium hydroxide, calcium hydroxide, iron, zinc, nickel and/or manganese oxide/hydroxide. The filler promotes the reactive compatibility between the olefin-based polymer with an epoxy group and the novolac polymer. The filler may also provide reactive compatibility between the novolac polymer and the thermoplastic polymer (when present). In an embodiment, the filler may be a flame-retardant or otherwise provide flame retardancy to the final composition.

It is known that the polar nature of the novolac polymers results in poor compatibility with olefin-based polymers and/or thermoplastic polymers (which are typically non-polar). Surprisingly and unexpectedly, the applicants have discovered that the provision of the olefin-based polymer with an epoxy group and the filler in the present composition promote compatibility between the olefin polymer moiety, the novolac polymer, and the thermoplastic polymer (when present). Not wishing to be bound by any particular theory, it is believed that during melting blending, one or more epoxy groups of the olefin-based polymer with an epoxy group react with one or more hydroxyl groups on the novolac polymer to form a polyolefin-graft-novolac-copolymer ("graft copolymer"). This graft copolymer acts as a compatibilizer between the olefin polymer moiety, the thermoplastic polymer (when present) and the novolac polymer. It is further believed, without limit to a particular theory, that provision of the filler produces an alkaline environment around the novolac polymer. This alkaline environment promotes dissociation of the O—H bonds within the novolac polymer, thereby promoting nucleophilic attraction between the epoxy group of the olefin-based polymer and the hydroxyl group. In a further embodiment, the filler is a metal hydrate, the metal hydrate producing an alkaline environment around the novolac polymer.

In an embodiment, when the thermoplastic polymer is present, the composition includes greater than 0 wt % to about 99.9 wt %, or from about 10 wt % to about 90 wt %, or from about 20 wt % to about 80 wt % of the thermoplastic polymer. Weight percent is based on the total weight of the composition.

In an embodiment, the composition includes greater than 0 wt % to about 60 wt %, or from about 10 wt % to about 50 wt %, or from about 15 wt % to about 30 wt % of the novolac polymer. Weight percent is based on the total weight of the composition.

In an embodiment, the composition includes greater than 0 wt % to about 99 wt %, or from about 0.1 wt % to about 10 wt % of the olefin-based polymer with an epoxy group. Weight percent is based on the total weight of the composition.

In an embodiment, the composition includes greater than 0 wt % to about 70 wt %, or from about 1 wt % to about 40 wt % of the filler. Weight percent is based on the total weight of the composition.

In an embodiment, the composition includes from about 55 wt % to about 65 wt % thermoplastic polymer, from about 15 wt % to about 25 wt % novolac polymer, from about 0.1 wt % to about 6 wt % olefin-based polymer with an epoxy group, and from about 10 wt % to about 30 wt % filler. Weight percent is based on the total weight of the composition.

The surprising and unexpected compatibility between the thermoplastic polymer and the novolac polymer (vis-á-vis provision of the olefin-based polymer with an epoxy group and the filler) yields a composition having superior mechanical properties. Moreover, the fine dispersion of the novolac polymer throughout the olefin-based polymer with an epoxy group and the thermoplastic polymer (when present) advantageously provides uniform dispersion of other components that would otherwise be incompatible with the thermoplastic polymer.

In an embodiment, the present composition has a tensile strength at 100% strain greater than about 2.1 Mpa, or greater than about 2.1 Mpa to about 4.5 Mpa, or from about 2.5 Mpa to about 4.0 Mpa. Tensile strength at 100% strain is measured in accordance with ASTM D638.

In an embodiment, the present composition has a tensile strength at 200% strain greater than about 2.2 Mpa, or greater than 2.2 Mpa to about 4.5 Mpa, or from about 2.5 Mpa to about 4.0 Mpa. Tensile strength at 200% strain is measured in accordance with ASTM D638.

In an embodiment, the composition may optionally include one or more additional components. The optional additional components are selected from a flame retardant, an anti-drip agent, a functionalized polyolefin, a processing additive, an elastomeric composition, a dispersed polymer, and combinations thereof.

The flame retardant can be a melamine-containing compound, a phosphate, a borate and combinations thereof. Nonlimiting examples of suitable melamine-containing compounds include melamine cyanurate, melamine phosphate, melamine pyrophosphate, melamine polyphosphate, 2,4,6-triamino-1,3,5-triazine, and mixtures of piperazine pyrophosphate and melamine pyrophosphate. Nonlimiting examples of suitable phosphates include triphenyl phosphate (TPP), resorcinol diphenyl phosphate (RDP), bisphenol A diphenyl phosphate, and (2,6-dimethylphenyl) 1,3-phenylene bisphosphate. A nonlimitng example of a suitable borate is zinc borate. In a further embodiment, the metal hydrate may provide flame retardancy alone or in combination with any of the foregoing flame retardants. In an embodiment, the flame retardant is halogen-free.

The present composition may include an anti-drip agent. The anti-drip agent prevents the composition from drip when exposed to flame. The anti-drip agent may be any halogen-free anti-drip agent as known in the art. Nonlimiting examples of suitable anti-drip agents include fluororesin, such as poly(tetrafluoroethylene), polyvinylidene fluoride or tetrafluoroethylene/hexafluoropropylene copolymers and ethylene/tetrafluoroethylene copolymers, teflon-grafted styrene-acrylonitrile copolymer (T-SAN), fluorinated polyolefin, lithium, sodium, potassium or cesium salt of 1,1,2,2-tetrafluoroethanesulfonate or 1,1,2,3,3,3-hexafluoropropanedulfonate. Further nonlimiting examples of suitable anti-drip agents includes silicone resins, silicone oil, phosphoric acid, phosphorous acid, hypophosphorous acid, hypophosphoric acid, phosphinic acid, phosphonic acid, metaphosphoric acid, hexanetaphosphoric acid, thiophosphoric acid, fluorophosphoric acid, difluorophosphoric acid, fluorophosphorous acid, difluorophosphorous acid, fluorohypophosphorous acid and fluorohypophosphoric acid. The anti-drip agent may be one or more of any of the aforementioned anti-drip agents. In an embodiment, the anti-drip agent is halogen-free.

In an embodiment, the composition may include a functionalized polyolefin. A nonlimiting example of a suitable functionalized polyolefin is maleic anhydride grafted polyolefin elastomer. The polyolefin elastomer may be an ethylene-based polymer.

In an embodiment, the composition may include one or more processing additives. Nonlimiting examples of suitable processing additives include anti-oxidants, chain extenders, processing aids, pigments, oils, and any combination thereof.

In an embodiment, the composition may include an elastomer. Nonlimiting examples of suitable elastomers include synthetic rubbers such as styrene-butadiene-styrene (SBS) block copolymer, and styrene-ethylene-butadiene-styrene (SEBS) block copolymer.

In an embodiment, the composition may include a dispersed polymer. The dispersed polymer may be blended with the novolac polymer before the novolac polymer is mixed or otherwise combined with the thermoplastic polymer (i.e., a pre-mix) prior to combination with the thermoplastic polymer. In another embodiment, the dispersed polymer is blended with the novolac polymer and the thermoplastic polymer simultaneously, or substantially simultaneously. The dispersed polymer may be added to provide additional desired properties to the final composition. Nonlimiting examples of suitable dispersed polymers include polyphenylene oxide, polycarbonate, and polyamide.

The present composition may comprise two or more embodiments as disclosed herein.

In an embodiment, a process for producing a heterophasic composition is provided. The process includes blending a novolac polymer, a filler, an olefin-based polymer with an epoxy group and optionally a thermoplastic polymer to form a heterophasic composition. The optional thermoplastic polymer, the novolac polymer, the filler, and the olefin-based polymer with an epoxy group may be any respective composition or material as previously disclosed herein.

In an embodiment, the process includes dispersing a discontinuous phase comprising the novolac polymer in a continuous phase comprising the olefin-based polymer with an epoxy group and the thermoplastic polymer (when present). In another embodiment, the blending is performed so as to uniformly disperse the discontinuous phase in the continuous phase.

In an embodiment, the components are melt blended to form the heterophasic composition. As used herein, "melt blending" is a process whereby at least two components are combined or otherwise mixed together, and at least one of the components is in a melted state. The melt blending may be accomplished by way of batch mixing, extrusion blending, extrusion molding, and any combination thereof. In an embodiment, the thermoplastic polymer (when present), the novolac polymer, the filler, and the olefin-based polymer with an epoxy group may be introduced into a batch mixer, heated, and mixed in a melted state. The mixture may then be introduced into an extruder to produce an extrudate of the heterophasic composition.

In an embodiment, the components undergo reactive melt blending. The term "reactive melt blending," as used herein, is a process whereby at least two components are combined or otherwise mixed together, at least one of the components is in a melted state, and a chemical reaction occurs between at least two of the components. Not wishing to be bound by any particular theory, it is believed that during reactive melting blending, the epoxy group of the olefin-based polymer with an epoxy group reacts with the hydroxyl groups of the novolac polymer to form a polyolefin-graft-novolac-copolymer ("graft copolymer"). This graft copolymer acts as a compatibilizer between the olefin polymer moiety, the thermoplastic polymer (when present) and the novolac polymer. It is further believed, without limit to a particular theory, that the filler provides an alkaline environment in the molten mixture which promotes dissociation of the novolac polymer O—H bonds, thereby promoting nucleophilic attraction from the epoxy group thereto.

In an embodiment, the melt blending and/or the reactive melt blending occurs by way of extrusion molding. The thermoplastic polymer (when present), the novolac polymer, the filler, and the olefin-based polymer with an epoxy group may be introduced directly into an extruder for melting, kneading and/or blending therein. The melting, kneading and/or blending may occur before and/or during extrusion. In an embodiment, the extrusion temperature is from about 120° C. to about 180° C., or about 150° C. The melted mass may then be extruded to form an extrudate. The extrudate may have any shape as desired (i.e., film, strand, pellet) or the like.

In an embodiment, the thermoplastic polymer and the olefin-based polymer with an epoxy group are melt blended together before the addition of the novolac polymer. The thermoplastic polymer and the olefin-based polymer with an epoxy group are combined to form a pre-mixture. The pre-mixture may be formed in a batch mixture or in an extruder. After a desired duration of mixing, the novolac polymer and the filler are introduced to the pre-mixture of the thermoplastic polymer/olefin-based polymer with an epoxy group. This 4-component blend may then be mixed and/or extruded as desired.

In an embodiment, the process includes forming a discontinuous phase of the novolac polymer into domains with a size less than about 10 μm, or from about 1 μm to less than about 10 μm, or from about 1 μm to about 5 μm, or from about 1 μm to about 3 μm. The reactive melt blending is performed for a sufficient time at sufficient temperature to ensure reactivity and compatibility between the thermoplastic polymer and the novolac polymer. In particular, the reactive melt blending is performed for a sufficient duration at a sufficient temperature to ensure that the olefin-based polymer with an epoxy group forms a polyolefin-graft-novolac polymer ("graft copolymer") yielding novolac polymer domains with a size less than about 10 μm. The reactive melt blending is continued to uniformly disperse the novolac polymer domains throughout the continuous phase of the thermoplastic polymer.

In an embodiment, the process includes blending one or more additional components selected from a flame retardant, an anti-drip agent, a functionalized polyolefin, a processing additive, an elastomeric composition, a dispersed polymer, and combinations thereof. Blending may occur by way of melt blending or reactive melt blending as disclosed above.

The present process may comprise two or more embodiments as disclosed herein.

The present disclosure provides another composition. In an embodiment, a heterophasic composition is provided. The heterophasic composition includes a continuous phase comprising an olefin-based polymer with an epoxy group and a discontinuous phase dispersed within the continuous phase. The discontinuous phase comprises a novolac polymer. The heterophasic composition also includes a filler.

The olefin-based polymer with an epoxy group may be any olefin-based polymer with an epoxy group as disclosed herein. In an embodiment, the olefin-based polymer with an epoxy group is a copolymer of an olefin and an unsaturated glycidyl ester. In a further embodiment, the olefin-based polymer with an epoxy group is an ethylene/glycidyl methacrylate copolymer having structure (IV) as previously disclosed herein.

In an embodiment, the continuous phase comprises a thermoplastic polymer in addition to the olefin-based polymer with an epoxy group. The thermoplastic polymer may be one or more thermoplastic polymers as disclosed herein. In an embodiment, the continuous phase includes a thermoplastic polymer that is an olefin-based polymer. In a further embodiment, the thermoplastic polymer is selected from an ethylene/α-olefin copolymer, an olefin block ethylene/α-olefin copolymer, and combinations thereof.

The heterophasic composition includes a discontinuous phase. The discontinuous phase comprises a novolac polymer and optionally one or more additional components. The novolac polymer may be any novolac polymer disclosed herein. In an embodiment, the novolac polymer is a phenol novolac polymer. In another embodiment, the discontinuous phase is uniformly dispersed throughout the continuous phase.

The filler may be one or more fillers as previously disclosed herein. The filler may be present in the continuous phase and/or in the discontinuous phase. In an embodiment, the filler is a metal hydrate.

The heterophasic composition may contain thermoplastic polymer, novolac polymer, olefin-based polymer with an epoxy group, and filler in the same, or substantially the same, ranges/amounts as disclosed herein for the composition. In an embodiment, the heterophasic composition includes greater than about 50 wt % to about 99.1 wt %, or from about 60 wt % to about 95 wt % of the continuous phase. The weight percent is based on the total weight of the heterophasic composition.

In an embodiment, the heterophasic composition includes from about 0.1 wt % to about less than 50 wt %, or from about 5 wt % to about 40 wt % of the discontinuous phase. The weight percent is based on the total weight of the heterophasic composition.

In an embodiment, the heterophasic composition includes from about 0.2 wt % to about 99 wt % of the olefin-based polymer with epoxy group. In another embodiment, the heterophasic composition includes from about 0 wt % to about 99.1 wt %, or from 15 wt % to about 95 wt % of the thermoplastic polymer. It is understood that the continuous phase may include the olefin-based polymer with an epoxy group alone or in combination with the thermoplastic polymer. The weight percent is based on the total weight of the heterophasic composition.

In an embodiment, the heterophasic composition includes from about 0.1 wt % to about 70 wt %, or from 5 to 55% of the filler. The weight percent is based on the total weight of the heterophasic composition.

In an embodiment, the discontinuous phase of the heterophasic composition has a domain size less than about 10 μm, or from about 1 μm to less than about 10 μm, or from about 1 μm to about 5 μm, or from about 1 μm to about 3 μm.

The discontinuous phase with a domain size of less than about 10 μm provides the present heterophasic composition with excellent mechanical properties. In an embodiment, the present heterophasic composition has a tensile strength at 100% strain greater than about 2.1 Mpa, or greater than about 2.1 Mpa to about 4.5 Mpa, or from about 2.5 Mpa to about 4.0 Mpa. Tensile strength at 100% strain is measured in accordance with ASTM D638.

In an embodiment, the present heterophasic composition has a tensile strength at 200% strain greater than about 2.2 Mpa, or greater than 2.2 Mpa to about 4.5 Mpa, or from about 2.5 Mpa to about 4.0 Mpa. Tensile strength at 200% strain is measured in accordance with ASTM D638.

The present heterophasic composition may optionally include one or more additional components as previously disclosed herein. The additional components may be selected from a flame retardant, an anti-drip agent, a functionalized polyolefin, a processing additive, an elastomeric composition, a dispersed polymer, and any combination thereof. The optional additional components may be a component of the continuous phase, the discontinuous phase, or a combination thereof.

FIG. 1 is an atomic force microscopy (AFM) image of a composition which includes an ethylene/α-olefin copolymer, a phenol novolac polymer, and a filler, such as metal hydrate. FIG. 1 shows phenol novolac polymer domains greater than 10 μm dispersed within the ethylene/α-olefin copolymer. Phenol novolac polymer domains greater than 10 μm indicate poor compatibility between the ethylene/α-olefin copolymer and the phenol novolac polymer.

Figure 2:
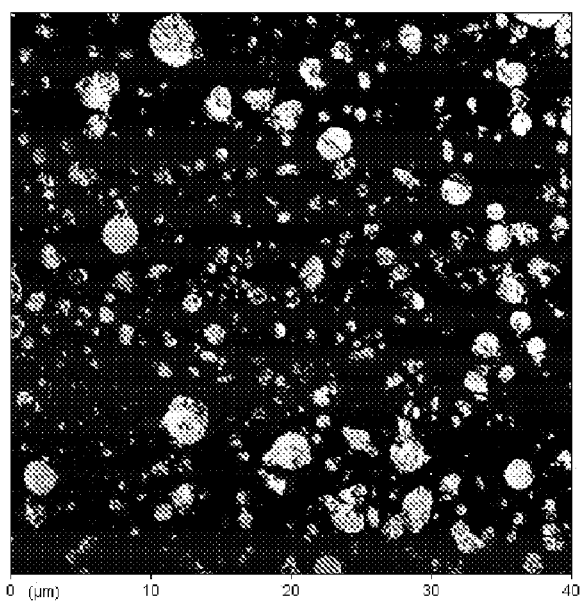
FIG. 2 is an AFM image of a heterophasic composition in accordance with an embodiment of the present disclosure.

FIG. 2 is an AFM image of an embodiment of the present heterophasic composition. The heterophasic composition of FIG. 2 includes a continuous phase comprising an olefin-based polymer with an epoxy group and an ethylene/α-olefin copolymer. The discontinuous phase comprises a phenol novolac polymer. The heterophasic composition of FIG. 2 also includes a filler, such as a metal hydrate. Provision of the olefin-based polymer with an epoxy group and the filler, such as a metal hydrate, yields phenol novolac polymer domains less than 10 μm in size or from about 1 μm to about 5 μm, or from about 1 μm to about 3 μm, as shown in FIG. 2. This domain size for the discontinuous phase for FIG. 2 indicates high compatibility between (i) the olefin-based polymer with an epoxy group and the ethylene/α-olefin copolymer (the continuous phase) and (ii) the phenol novolac polymer (the discontinuous phase).

Figure 3:
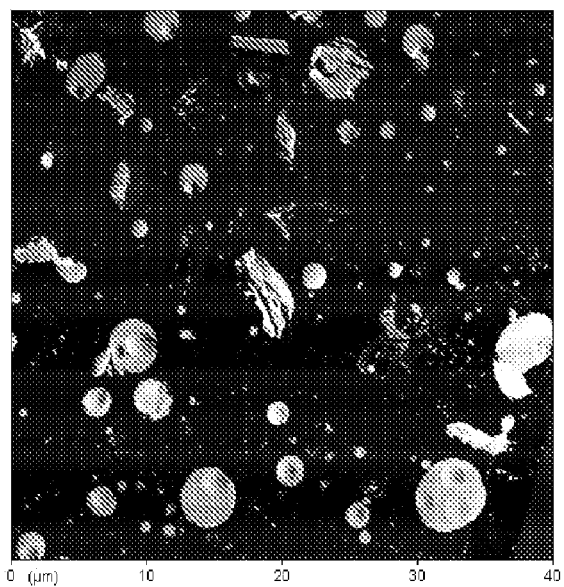
FIG. 3 is an AFM image of a composition.

FIG. 3 is an AFM image of a composition which includes an ethylene/α-olefin copolymer and a phenol novolac polymer. The composition of FIG. 3 also includes an olefin-based polymer with an epoxy group and a flame retardant. The FIG. 3 composition is void of filler (i.e., void of a metal hydrate). The domain size for the novolac polymer of FIG. 3 is greater than the domain size of the novolac polymer of FIG. 2.

Figure 4:
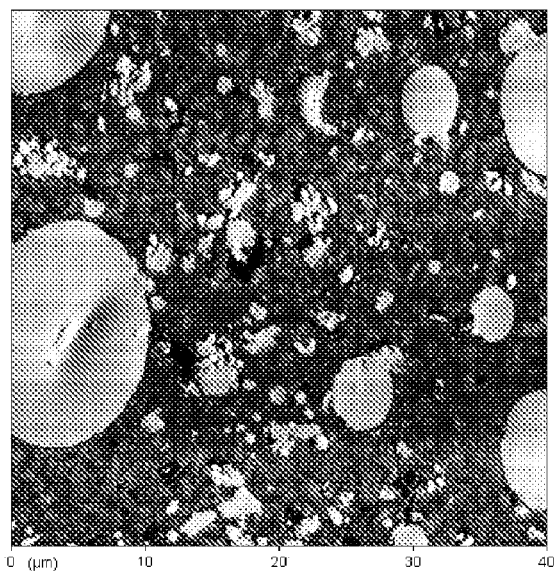
FIG. 4 is an AFM image of a composition.

FIG. 4 is an AFM image of a composition which includes an olefin block copolymer, a phenol novolac polymer, and a filler, such as metal hydrate. The composition of FIG. 4 does not include an olefin-based polymer with an epoxy group. FIG. 4 shows novolac polymer domains greater than 10 μm dispersed within the olefin block copolymer. Phenol novolac polymer domains greater than 10 μm indicate poor compatibility between the olefin block copolymer and the phenol novolac polymer.

Figure 5:
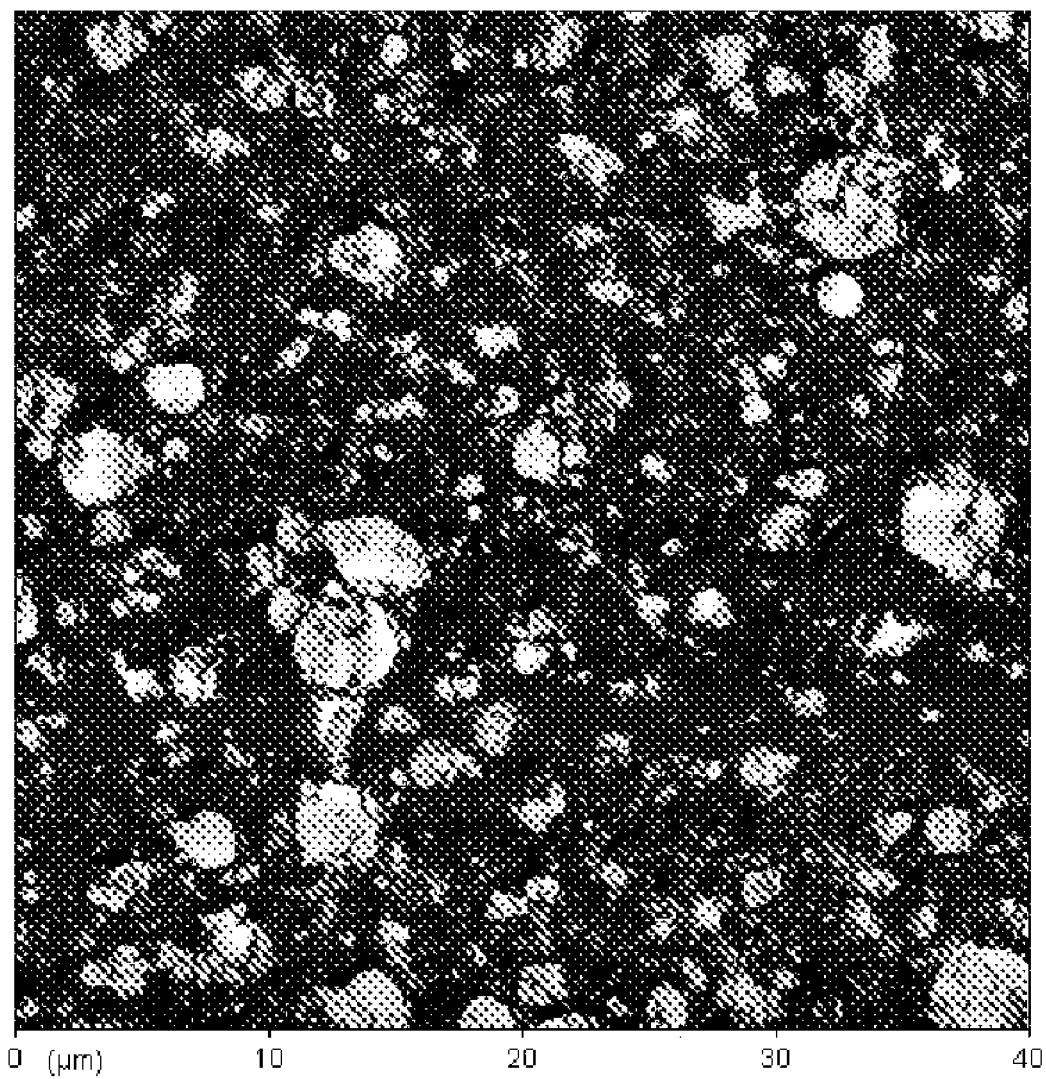
FIG. 5 is an AFM image of a heterophasic composition in accordance with an embodiment of the present disclosure.

FIG. 5 is an AFM image of an embodiment of the present heterophasic composition. The heterophasic composition of FIG. 5 includes a continuous phase comprising an olefin-based polymer with an epoxy group and an olefin block copolymer and a discontinuous phase comprising a phenol novolac polymer. The heterophasic composition of FIG. 5 also includes a filler, such as metal hydrate. Provision of the olefin-based polymer with an epoxy group and the filler (such as a metal hydrate), yields phenol novolac polymer domains less than 10 μm, or from about 1 μm to about 5 μm, or from about 1 μm to about 3 μm, as shown in FIG. 5. This small domain size for the discontinuous phase for FIG. 5 indicates high compatibility between the (i) olefin-based polymer with an epoxy group and the olefin block copolymer (the continuous phase) and (ii) the phenol novolac polymer (the discontinuous phase).

The present heterophasic composition may comprise two or more embodiments as disclosed herein.

The present compositions/heterophasic compositions may be a component of a thermoformed article, a blow-molded article, and/or an injection molded article.

The present composition(s)/heterophasic compositions are suitable as a halogen-free insulation that is flame retardant, and are particularly suited for wire and cable applications. The present composition(s)/heterophasic composition(s) are flexible, solvent resistant, thermally stabile, and have mechanical strength while simultaneously providing a halogen-free, flame retardance and char-forming performance during combustion.

The present composition(s)/heterophasic composition(s) may be a component in one or more of the following articles: artificial leather, automotive parts such as automotive interiors, electronic hand-held devices (data devices, personal digital assistant, cell phones, computer games), roofing products, foam insulation, wall layers, and other building/construction materials (wood, concrete, and/or clay substitute).

Definitions

All reference to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

By way of example, and not by limitation, examples of the present disclosure are provided.

Composition Components

TABLE 1

| Composition | Component | Available as |
|---|---|---|
| A1 Thermoplastic polymer | Ethylene/butene copolymer | Engage 7467; from The Dow Chemical Company |
| A2 Thermoplastic polymer | Olefin block ethylene/butene copolymer (OBC) | Infuse D9100, from The Dow Chemical Company |

TABLE 1-continued

| Composition | Component | Available as |
|---|---|---|
| B Novolac polymer | Phenol Novolac | KPH-F-2002 from Kolon Chemical of Korea, Mw ~1200. |
| C Olefin-based polymer with an epoxy group | Ethylene/glycidyl methacrylate (EGMA) | Igetabond 2C from Sumitomo Chemical, with 6 wt % GMA, 94 wt % ethylene, MFR ~3 g/10 min 1.5 |
| D Filler | Aluminum hydroxide | grade H42M, from Showa Chemical 20 |
| E Functionalized polyolefin | MAH polyolefin elastomer | Amplify GR216 from The Dow Chemical Company |
| F Flame retardant | | Intumescent FR filler, FP-2100 from Adeka |

2. Processing

The compositions shown in Table 1 are prepared in a HAAKE Rheomix 600OS mixer, with drive system as Polylab Drive RheoDrive7, produced by Thermo Scientific. The mixing temperature is 150° C.

With roller rotor, at 10 RPM rotor speed, component A and component C are added into a mixing bowl and mixed for 2 minutes to reach a homogenous melt state. Components B and D (and optionally E and F) are then added into the bowl in 2 minutes, following with 5 minutes mixing at 50 rpm. After the mixing, the blend is taken from the mixing bowl, and cooled to room temperature.

A compression molded plaque is prepared by compression moulding at 150° C. Preheating time is about 3 minutes, followed with 2 minutes pressing under 15 Mpa. The plaque is cooled to room temperature, and cut into specimen fit for ASTM D-638 Type IV tensile testing.

3. Testing

Tensile testing is conducted on Instron tensile tester (Model 5565 from Instron) according to ASTM D638. Tensile strength at 100% and 200% strain and tensile elongation at break is used to evaluate tensile performance.

4. Cryo-Microtome for Morphology Observation

Cryo-Microtome: Specimens for microtomy are cut out with a razor blade. The isolated pieces are razor trimmed to an appropriate size for cryo-microtomy. Polishing of the cross section is performed using a diamond knife at −120° C. on a Leica UC6 microtome equipped with an FC6 cryo-sectioning chamber. Cross machine direction (CMD) specimens are selected and polished at the same time for scanning.

5. Atomic Force Microscopy (AFM)

Atomic force microscopy (AFM) images are obtained on a Nanoscope V using a Dimension V Large Sample AFM (Veeco, Inc) and hybrid scanner head. The microscope is outfitted with coaxial zoom optics for reflected light imaging up to about 1000× magnification. The microscope is operated in the Tapping Mode™ where the lever is oscillated at resonance and the feedback control adjusts for constant tapping amplitude. Scanning is carried out in air using commercially available silicon cantilevers and tips with nominal force constants of 48 N/m (LTESPW Tapping mode etched silicon probes). Estimated normal scanning forces under these conditions are in the 10-8 to 10-9 N range. Digital images are either 512×512 pixels. Digital images are pseudo-colored to according to measured property (height, amplitude, and phase). A0: 2000 mv, Asp: 1300 mv~1500 m.

Table 2 below provides examples of present compositions (E) and comparative examples (C).

TABLE 2

| Component Amounts are wt % Based on Total Weight of Composition | | | | | | | | |
|---|---|---|---|---|---|---|---|---|
|  | E1 | E2 | E3 | E4 | E5 | C-1 | C-2 | C-3 |
| Component A1 | 60 | 57.5 | 0 | 60 | 0 | 62.5 | 0 | 60 |
| Component A2 | 0 | 0 | 60 | 0 | 60 | 0 | 62.5 | 0 |
| Component B | 17.5 | 17.5 | 17.5 | 17.5 | 17.5 | 17.5 | 17.5 | 17.5 |
| Component C | 2.5 | 5 | 2.5 | 1.5 | 1.5 | 0 | 0 | 2.5 |
| Component D | 20 | 20 | 20 | 20 | 20 | 20 | 20 | 0 |
| Component E | 0 | 0 | 0 | 1 | 1 | 0 | 0 | 0 |
| Component F | 0 | 0 | 0 | 0 | 0 | 0 | 0 | 20 |
| Tensile Strength@ 100% Strain (Mpa) | 2.51 | 3.06 | 3.68 | 2.63 | 3.54 | 1.39 | 2.07 | 2.02 |
| Tensile Strength@ 200% Strain (Mpa) | 2.77 | 3.38 | NA | 2.87 | 3.59 | 1.52 | 2.14 | 2.15 |
| Elongation at break, % | 504 | 400 | 186 | 625 | 930 | >1200* | 895 | 490 |
| Figure |  | 2 | 5 |  |  | 1 | 4 | 3 |

*No break up to the testing limitation of the device.

As shown in Table 2, E1 and E2 with addition of EGMA, tensile strength at 100% and 200% strain increase dramatically compared to C-1. The morphology of C1 is shown in FIG. 1. The size of novolac domain is greater than 10 microns, indicating poor compatibility with polyolefin elastomer matrix. FIG. 2 is morphology of composition E1 which contains EGMA. The novolac domain size decreases to about 1~3 microns, showing an increase in compatibility, consistent with an increase in tensile strength. When shifting the polymer matrix from random ethylene/butene copolymer to OBC matrix, comparison between E3 and C-2 shows the same effect of EGMA as an effective precursor in reactive compatiblization with phenol novolac. Morphologies of E3 and C-2 are shown in FIGS. 5 and 4 respectively. The novolac domain size is much finer in E3 than that in C-2. It is believed that in situ reaction between the epoxy group on the EGMA chain and the hydroxyl group on the phenol novolac occurs during melting blending, resulting in formation of EGMA-g-Novolac copolymer as compatibilizer.

With the presence of EGMA, by replacing the filler, such as metal hydrate, with another component such as a flame retardant in C-3, tensile strength dropped compared to E1. The morphology of C-3 is shown in FIG. 3. The novolac domain size becomes larger than in E1, showing poor compatibility. From this phenomena, it is believed that the addition of the filler, such as metal hydrate, accelerates in situ reactive compatibilization between EGMA and phenol novolac. It is believed that the powder filler, such as metal hydrate, provides an alkaline condition around the particle surface, and thus promotes breaking of the H—O bond on the phenol novolac, making nucleophilic attack of the epoxy ring more likely.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   about 15 wt % to about 30 wt % of a novolac polymer;
   about 0.1 wt % to about 10 wt % of an olefin-based polymer with an epoxy group; and
   greater than 0 wt % to about 70 wt % of a filler.

2. The composition of claim 1 further comprising a thermoplastic polymer.

3. The composition of claim 2 comprising greater than 0 wt % to about 99 wt % thermoplastic polymer.

4. The composition of claim 3 wherein the thermoplastic polymer is an olefin-based polymer.

5. The composition of claim 3 wherein the novolac polymer is a phenol novolac polymer.

6. The composition of claim 3 wherein the olefin-based polymer with an epoxy group comprises an unsaturated glycidyl ester.

7. The composition of claim 3 comprising an additional component selected from the group consisting of a flame retardant, an anti-drip agent, a functionalized polyolefin, a processing additive, an elastomeric composition, a dispersed polymer, and combinations thereof.

8. The composition of claim 3 wherein the olefin-based polymer with an epoxy group comprises an ethylene/glycidyl methacrylate copolymer and the thermoplastic polymer is selected from the group consisting of an ethylene/α-olefin copolymer, an olefin block ethylene/α-olefin copolymer, and combinations thereof.

9. The composition of claim 3 comprising:
   a continuous phase comprising the olefin-based polymer with an epoxy group;
   a discontinuous phase comprising the novolac polymer dispersed in the continuous phase; and
   a filler.

10. The composition of claim 9 wherein the continuous phase comprises the olefin-based polymer with an epoxy group and a thermoplastic polymer.

11. The composition of claim 10 comprising greater than about 50 wt % to about 99 wt % of the continuous phase and from about 1 wt % to about less than 50 wt % of the discontinuous phase.

12. The composition of claim 11 wherein thermoplastic polymer is selected from the group consisting an ethylene/α-olefin copolymer, an olefin block ethylene/α-olefin copolymer, and combinations thereof.

13. The composition of claim 9 wherein the discontinuous phase comprises a phenol novolac polymer.

14. The composition of claim 9 wherein the discontinuous phase has a domain size less than about 10 μm.

15. The composition of claim 9 wherein the olefin-based polymer with an epoxy group comprises an unsaturated glycidyl ester.

16. The composition of claim 9 comprising a component selected from the group consisting of a flame retardant, an anti-drip agent, a functionalized polyolefin, a processing additive, an elastomeric composition, a dispersed polymer, and combinations thereof.

17. An article comprising at least one component formed from the composition of claim 1.

18. A process for producing a heterophasic composition comprising:

blending a novolac polymer, a filler, an olefin-based polymer with an epoxy group, and optionally a thermoplastic polymer; and forming a heterophasic composition.

19. The process of claim 18 comprising forming a discontinuous phase comprising novolac polymer domains of less than about 10 µm in a continuous phase comprising the olefin-based polymer with an epoxy group and optionally the thermoplastic polymer.

20. An article comprising at least one component formed from the composition of claim 9.

* * * * *